Nov. 5, 1946.	S. ROSEN	2,410,552
MEASURING DEVICE
Filed Nov. 20, 1944

Sidney Rosen INVENTOR.
BY Sidney Rosen

Patented Nov. 5, 1946

2,410,552

UNITED STATES PATENT OFFICE 2,410,552

MEASURING DEVICE

Sidney Rosen, Baltimore, Md.

Application November 20, 1944, Serial No. 564,244

10 Claims. (Cl. 222—209)

The present invention relates to new and useful improvements in measuring devices for use in connection with pipettes or similar appliances for collecting and transferring liquids, and has special reference to improvements in a measuring device for drawing a liquid into and effecting its controlled discharge from the pipette.

One object of the invention is to provide a measuring device of this character which may be easily operated to draw a desired volume of liquid into the pipette and to effect the discharge of any desired quantity with a high degree of accuracy.

Another object of this invention is to provide a measuring device of the stated character whereby the whole or any predetermined portion of the liquid drawn into a pipette may be discharged with ease and facility.

Still another object of this invention is to provide in a measuring device of this character a safety trap for restricting the flow of any liquid from the pipette into the mechanism of the measuring device herein described.

With these and other objects in view, which will appear in the course of the subjoined description, the invention consists of the novel features of construction, combination and arrangement of parts hereinafter fully described and claimed, and as shown in the accompanying drawing in which:

Figure 1:
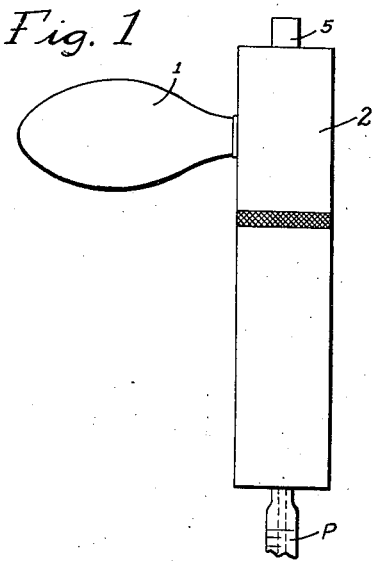
Figure 1 is a front elevational view of the measuring device herein described.
Figure 2:
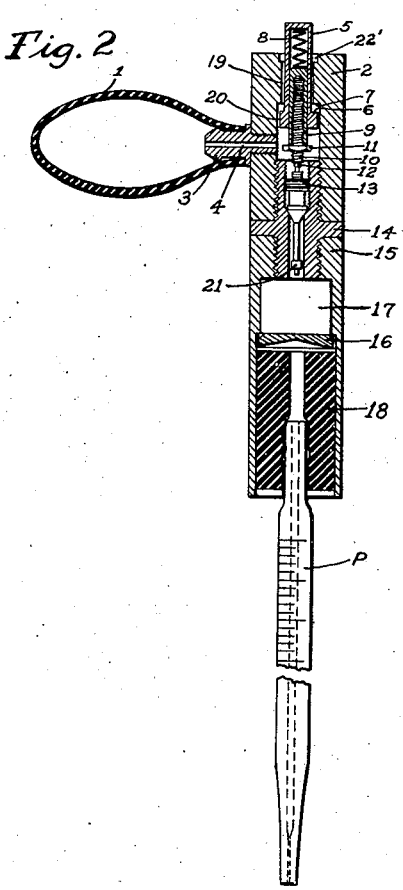
Figure 2 is a central vertical longitudinal section through the measuring device constructed in accordance with the invention and showing the position of the parts when measuring off a desired quantity of liquid.

Referring now more particularly to the drawing, the device as disclosed therein comprises a bulb 1, of rubber or other suitable resilient material, having a single opening. This is attached to an upper casing section 2 by means of a coupling 3 provided with bore 4 which permits the passage of air between the bulb and the upper casing section. Loosely fitted in the upper casing is a plunger 5. Normally, the projecting edge 6, of the plunger bears against the inner projecting edge 7 of the upper casing section, under the effect of the pressure exerted by the spring 8. The pressure exerted by this spring is such that it is not sufficient to unseat, i. e. open, valve core 13 when the plunger 5 is in normal position and not acted upon by finger pressure. The particular importance of this spring will become apparent as the description progresses.

Sufficient clearance is provided between the plunger and the bore of the upper casing section to permit the free passage of air between the bulb, the bore of the upper casing section and the atmosphere. The spring 8 seated in the plunger cylinder is kept in a state of compression, as hereinafter described, by the action of the piston or plunger 9, which has a sliding fit in the plunger cylinder. The degree of compression of the spring is regulated by adjusting screw 10 and adjusting nut 11 which latter also serves as a stop for the movement of the piston 9 into the plunger cylinder. The adjusting screw bears directly on the valve stem 12 of the pneumatic type valve 13. The latter is the self-contained type having an inner spring which normally exerts sufficient pressure to seal the seating surfaces. The valve body 14 acts as a housing for the valve core and also serves to couple the upper casing section 2 to the lower casing section 15. The normally closed valve core acts as a seal between the bores of the upper and lower casing sections until the plunger 5 is acted upon by finger pressure. Baffle plate 16 serves to arrest the passage of any fluid that may accidently be drawn up from the pipette. A resilient sleeve 18 fits into the lower casing section 15 and serves to couple the pipette 8 to the measuring device and form an airtight seal therewith. Chamber 17 acts as a receptacle for any liquid that may unavoidably flow past the baffle plate into chamber 17. The baffle plate checks the velocity of the liquid and reduces the amount which may enter the chamber 17 and prevents the liquid from jetting up into valve 13 and interfering with its operation. If desired, the chamber 17 may be filled with some absorbing substance to absorb the entering liquid or vapors therefrom when vaporous liquids are being measured so as to prevent the passage of the vapors into the mechanism of the measuring device.

The parts which I choose to call the vernier portion of the measuring device include the hollow plunger 5, spring 8, plunger sleeve or piston 9, adjusting screw 10 forming a plunger rod or stem threaded into the sleeve, and adjusting nut 11. As hereinafter described, this combination of parts in conjunction with the remainder of the mechanism, enables the operator to measure off the smallest quantity of liquid with extreme accuracy.

If the spring 8 is eliminated and finger pressure is transmitted directly to the valve core stem 12, accurate measurements become difficult and uncertain, depending upon the application of a very precise amount of finger pressure and a slight movement of the operator's finger since the liquid in the pipette is subjected to atmospheric pressure as soon as the valve unseals. This difficulty is especially apparent when using the smaller size pipettes where the slightest excess motion of the plunger causes a rapid downward movement of the liquid in the pipette. By applying finger pressure through the medium of spring 8, the operator can apply small increments of pressure through a distance of approximately ¼ inch depending on the size of spring used, so as to produce more or less air leakage past the valve seat and so produce a slow or rapid movement of the liquid level in the pipette.

In assembling the measuring device the tension of spring 8 on the valve core stem is adjusted by means of screw 10 and nut 11 so that leakage is impending before the application of finger pressure, i. e., so that the closing pressure of the spring of valve 13 is almost balanced and said valve is almost at the point of opening and will be opened by a slight downward movement of the plunger. The sensitivity of the valve to opening movements under pressure of the plunger is thus increased and the valve rendered quick-closing when such pressure is removed. The pressure exerted by spring 8 tends to unseat the sealing surfaces of the valve core and is in a direction opposite to and tends to almost balance the pressure of the self-contained spring in the valve core. If the valve core stem is not thus preloaded and finger pressure is applied, the slight movement of the lower valve 21, up to the time that leakage occurs, displaces sufficient air to cause an appreciable change in the level of the liquid in the pipette, producing a false reading. If finger pressure is relaxed before leakage occurs the level of the liquid will be found to have resumed its former position. The use of what I have previously titled the vernier portion, assembled in the manner described, eliminates both of these difficulties and permits micrometric measurements to be made with ease and facility. Measurements as close as one-thousandth of a milliliter can be made with a graduated one-tenth milliliter pipette.

Figure 3:
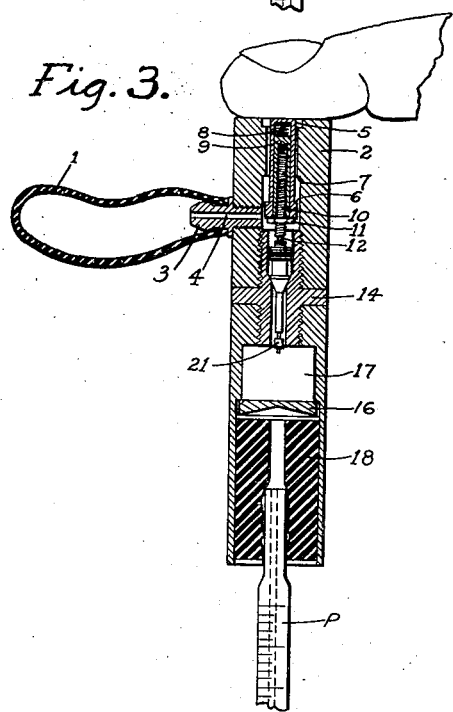
Figure 3 is a central vertical longitudinal section through the device, showing the position of the parts when drawing liquid into the pipette.
Figure 4:
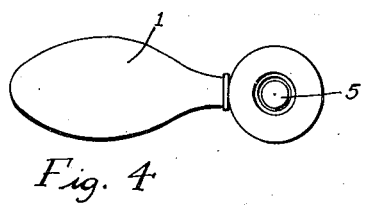
Figure 4 is a top plan view of the device.

To operate the device, the bulb 1 is collapsed and the tip of the pipette is immersed in the liquid. Air from the bulb is thus evacuated to the atmosphere through the clearance openings 19 and 20. Plunger 5 is then completely depressed by the finger as shown in Figure 3 so as to seal off the atmosphere from the bulb and the bore of the upper casing section. In this operation the plunger 5 seats against the lock nut 11 causing the finger pressure to be applied directly to the valve core stem 12, thus opening the valve completely and placing the single opening of the bulb in open communication with the bore of the pipette while sealing the opening off from the atmosphere. The bulb is then permitted to distend until the desired amount of liquid has been drawn up into the pipette. At this time the plunger 5 is released, sealing off the bore of the pipette from the bulb and the atmosphere and stopping the flow of the liquid into the pipette. The capillary lower end of the pipette prevents the liquid already drawn up from escaping and the level of the liquid is thus maintained for further manipulative action.

To measure off any desired quantity of liquid from the pipette the plunger 5 is depressed so as to apply pressure to the valve core stem 12 through spring 8 and piston 9. To effect rapid discharge of the liquid the plunger 5 is depressed sufficiently so that it seats on the adjusting nut 11, the finger being so placed on the plunger that a portion of the recess 21' is left uncovered and open to the atmosphere. The liquid may also be discharged by completely depressing the plunger so as to seal off recess 21' from the atmosphere and collapsing the bulb. The liquid will thus be forced out under pressure.

From the foregoing description, taken in connection with the drawing, the construction and mode of use of the device will be readily understood without a further and extended description. The advantages of this novel and improved construction of pipette control are that it enables the operator to measure off small quantities of liquid from a pipette with extreme accuracy; the tubular construction permits it to be held securely while performing any manipulative action; liquid accidently drawn up into the control device is restricted from flowing into and damaging the mechanism.

While the construction disclosed is preferred, it is to be understood that the invention is not limited thereto, and that changes in the form, construction and arrangement of parts may be made, within the scope of the appended claims, without departing from the spirit or sacrificing any of the advantages of the invention.

What I claim is:

1. In a measuring device for use in connection with a pipette, a tube, a bulb in open communication with the tube and with the atmosphere through the upper end of said tube, means at the lower end of said tube to receive and form a seal with one end of the pipette, a baffle plate and chamber within said tube to restrict the flow of liquid therein, a normally closed valve interposed between the bulb and the pipette to seal one end of the tube from the other and a plunger comprising an inner plunger member bearing upon said valve, a spring bearing on the inner plunger member, and an outer plunger member relatively movable to and adapted to transmit motion through the spring to the inner plunger member, said outer plunger member extending beyond the top of the tube so as to be manually actuatable and to enable a finger of the operator to simultaneously depress the said outer plunger member and seal the upper end of the tube opening.

2. A precision measuring device, of the character described, for use in connection with a pipette and comprising in combination a resilient bulb having a single opening so placed in juxtaposition to a manually controlled valve as to permit the flow of air alternately between the bulb and the atmosphere, the bulb and the pipette, the pipette and the atmosphere, and means for applying small increments of pressure to the valve consisting of an inner plunger member for opening and controlling the closing movement of the valve, an outer manually operable plunger member, and a spring between said inner and outer plunger members for transmitting motion from the latter to the former.

3. A precision measuring device, of the character described, for use in connection with a pipette and comprising in combination a resilient bulb having a single opening communicating with a tube and attached thereto, the bulb being open to the atmosphere through one end of such tube the other end being adapted to be connected to one end of a pipette for drawing liquid by suction into the other end of said pipette, a normally closed valve within said tube, and a manually actuatable spring loaded plunger extending through an opening in the top of the tube to enable a finger of the operator to simultaneously depress the plunger and cover or uncover said opening.

4. In a measuring device for use in connection with a pipette, the combination with a suction bulb, a tube having means at one end for connecting with one end of a pipette, a spring closed valve contained within the tube for regulating the charge and discharge of air from the bulb and pipette, a spring loaded plunger for imposing on the valve an opening pressure below but nearly balancing the closing pressure of its spring, and means for increasing the pressure of the plunger on the valve and thereafter relaxing such pressure.

5. A precision measuring device of the character described for use with a pipette or the like comprising a casing having an air passage extending therethrough, means at the lower end of the casing for holding one end of a pipette connected thereto and in communication with the passage, a suction bulb communicating with the passage in proximity to the upper end of the casing, a valve in said passage between the pipette and bulb, and a plunger device at the upper end of the casing for controlling said valve, said device comprising a plunger member movable to valve opening and closing positions, a plunger member projecting outwardly beyond the upper end of the casing, and a resilient motion transmitting connection between said plunger members.

6. A precision measuring device of the character described for use with a pipette or the like comprising a casing formed of upper and lower sections and having an air passage, a hollow coupling detachably uniting the casing sections, means at the lower end of the lower section of the casing for receiving and holding one end of a pipette and connecting the same with the passage, a suction bulb communicating with the passage in proximity to the upper end of the upper section of the casing, a normally closed valve mounted in the coupling and disposed in said passage between the pipette and bulb, and means at the upper end of the upper section of the casing for controlling said valve, said means comprising an inner plunger member movable in opposite directions to respectively open the valve and to permit it to close, an outer plunger member projecting inwardly of and outwardly beyond the upper end of the upper section of the casing, and a spring disposed between said plunger members for normally holding the outer plunger member outwardly projected and permitting it to be forced inwardly to open the valve and to be controlled on its outward movement in conjunction with the spring by a finger of the operator, said spring forming a yielding motion transmitting connection between the plunger members whereby the inner plunger member may be operated to open the valve to different degrees and controlled to regulate the valve closing movements.

7. A precision measuring device of the character described for use with a pipette or the like comprising a casing having an air passage extending therethrough, means at one end of the casing for receiving and holding one end of a pipette and connecting the same with the passage, a suction bulb communicating with the passage adjacent to the opposite end of the casing, a normally closed valve in said passage between the pipette and bulb, and means at the second named end of the casing for controlling said valve, said means comprising an inner plunger member formed of a sleeve and a rod in threaded adjustable engagement therewith, said member being normally in engagement with the valve and movable inwardly to open the valve and outwardly to permit it to close, an outer plunger member projecting inwardly of and outwardly beyond said end of the casing and telescopically engaging the inner plunger member, and a spring disposed between said plunger members for normally holding the outer plunger member outwardly projected and permitting it to be forced inwardly to open the valve and to be controlled on its outward movement in conjunction with the spring by an operator's finger, said spring forming a yielding motion transmitting connection between the plunger members whereby the inner plunger member may be operated to open the valve to different degrees and controlled to regulate the valve closing movements.

8. A precision measuring device of the character described for use with a pipette or the like comprising a casing having an air passage, means at one end of the casing for receiving and holding one end of a pipette and connecting the same with the passage, a suction bulb communicating with the passage in proximity to the opposite end of the casing, a normally closed valve in said passage between the pipette and bulb, and means at the second named end of the casing for controlling said valve, said means comprising an inner plunger member having an adjustable valve engaging element and movable in opposite directions to respectively open the valve and to permit it to close, an outer plunger member projecting inwardly of and outwardly beyond said end of the casing, means for adjusting the adjustable valve engaging element of the inner plunger member, and a spring disposed between said plunger members for normally holding the outer plunger member outwardly projected and permitting it to be forced inwardly to open the valve and to be controlled on its outward movement in conjunction with the spring by an operator's finger, said spring forming a yielding motion transmitting connection between the plunger members whereby the inner plunger member may be operated to open the valve to different degrees and controlled to regulate the valve closing movements.

9. A precision measuring device of the character described for use with a pipette or the like comprising a casing having an air passage, means at one end of the casing for receiving and holding one end of a pipette and connecting the same with the passage, a suction bulb communicating with the passage in proximity to the opposite end of the casing, a spring closed valve normally held in closed position by its spring and disposed in said passage between the pipette and bulb, and means at the second named end of the casing for controlling said valve, said means comprising an inner plunger member normally engaged with the valve and movable in opposite directions to respectively open the valve against the action of its spring and to permit it to close under the action of its spring, an outer plunger member projecting inwardly of and outwardly beyond said end of the casing, and a spring disposed between said plunger members for normally holding the outer plunger member outwardly projected and the inner plunger member in engagement with the valve and normally exerting pressure on the valve in an opening direction to a degree partially balancing the closing pressure of the closing spring of the valve, said spring forming a motion transmitting connection between the plunger members whereby the inner plunger member may be operated to open the valve to different degrees and controlled to regulate the valve closing movements.

10. A device of the character described adapted to be used in connection with a pipette comprising a casing, a bulb attached to the casing and having a single opening, said casing being provided with a bore normally in open communication with the opening in the bulb and with the atmosphere, a normally closed valve within said casing sealing off one end of the bore from the other, and a plunger mechanism comprising a piston for opening the valve, a spring, and a plunger for transmitting motion through the spring to the piston and constituting a means for accurately controlling the opening or closing of the valve and controlling said bore so as to permit of the passage of air between the bulb opening and the atmosphere, the bulb opening and the pipette, or between the pipette and the atmosphere, when the plunger is manually actuated by a finger of the operator.

SIDNEY ROSEN.